Jan. 11, 1944.   A. L. PARKER   2,339,101
CHECK VALVE ASSEMBLY
Filed March 13, 1941
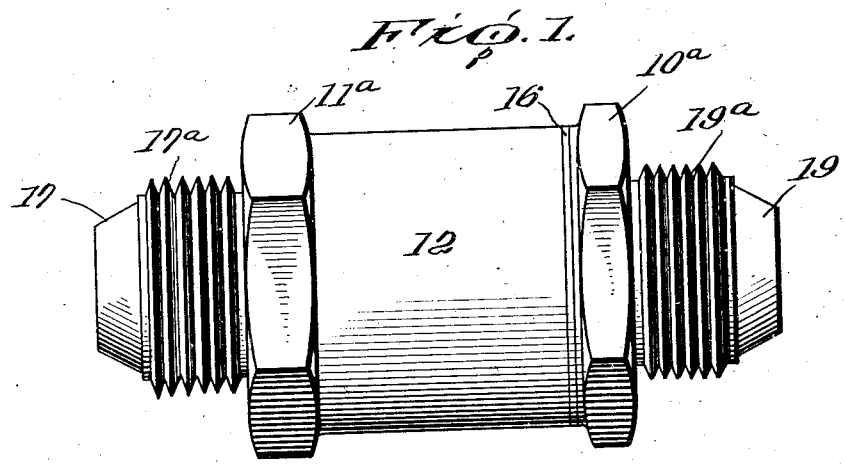
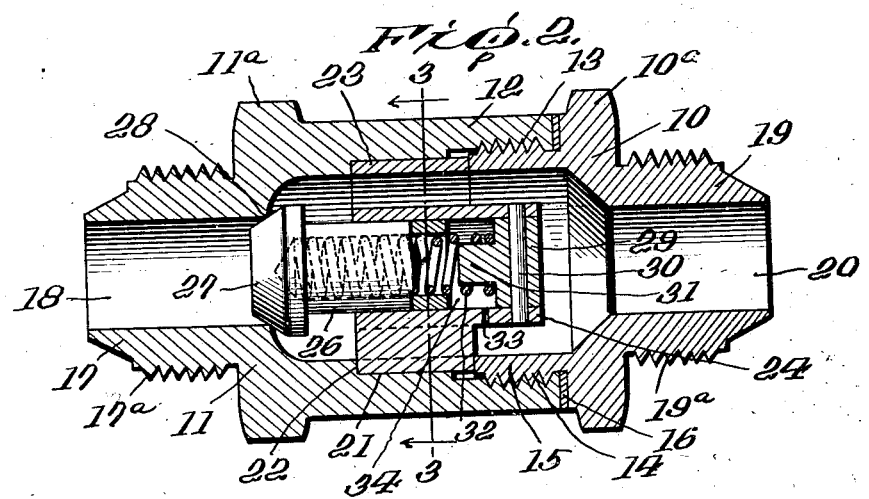
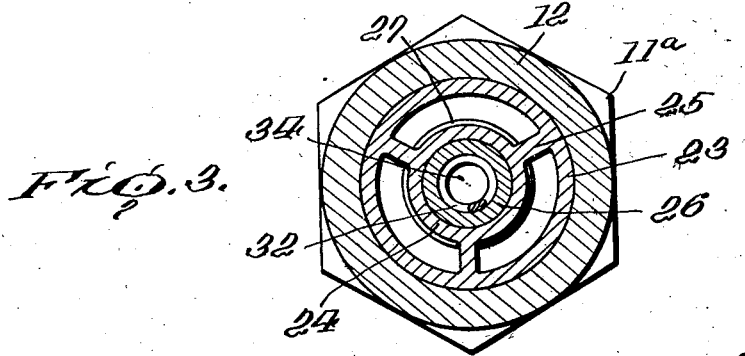
INVENTOR
Arthur L. Parker
By Mason & Porter
ATTORNEYS Patented Jan. 11, 1944

2,339,101

UNITED STATES PATENT OFFICE 2,339,101

CHECK VALVE ASSEMBLY

Arthur L. Parker, Cleveland, Ohio

Application March 13, 1941, Serial No. 383,206

2 Claims. (Cl. 251—146)

The present invention relates to new and useful improvements in a valve assembly for controlling the passage of fluid, and more particularly to improvements in a check valve assembly for use in hydraulic pressure lines.

In various hydraulic pressure systems, it is often desirable to include one or more check valves which operate to automatically open and close the pressure line in accordance with the pressure differential upon opposite sides of the valve. As the pressure varies, the valve is correspondingly moved in opposite directions and in order for the valve to properly and efficiently function to provide a tight seal between the valve and the valve seat, it is necessary to exactly center the relatively movable parts so as to prevent any jamming thereof. The present invention contemplates the provision of a check valve assembly which can be made in extremely small sizes and which is constructed and arranged so as to prevent chattering or pounding of the valve during operation thereof. In the pressure systems of aircraft or the like, there are rigid weight and size requirements which must be complied with and the present check valve assembly is particularly adapted to be employed with the relatively small tube or pipe lines of aircraft pressure systems. Thus, the valve assembly is constructed and arranged so that it will occupy a minimum amount of space and so that it will not materially increase the weight of the coupled pressure lines.

An object of the present invention is to provide a valve assembly of relatively small dimensions which is constructed and arranged so as to maintain a substantially free flow of fluid therethrough and so as to prevent chattering or pounding of the valve.

A further object of the invention is to provide a valve assembly of the above type wherein the fluid flows around the valve member, when open, and along a substantially unobstructed annular passage so as to eliminate the necessity of directing the fluid through relatively small apertures in the valve.

A still further object of the invention is to provide a valve assembly of the above type wherein the relatively movable parts of the valve assembly are supported in such a manner, preferably by the same coupling part, so as to obviate the necessity of compensating for any inaccuracy or eccentricity of the joint between the connected coupling parts.

The invention still further aims to provide a valve assembly of the above type which is relatively simple in construction, which occupies a minimum amount of space, and which is thoroughly efficient in use.

The above and other objects of the invention will in part be obvious and will be hereinafter more fully pointed out.

In the accompanying drawing:

Figure 1 is a side elevation of the valve assembly.

Figure 2 is a longitudinal sectional view of the valve assembly.

Figure 3 is a sectional view taken along the line 3—3 of Figure 2.

Referring more in detail to the accompanying drawing, the valve casing is illustrated as including male and female coupling parts 10, 11, respectively. The female coupling part includes a sleeve portion 12 which extends toward the male coupling part 10 and provides a housing wall for the assembly. One end of the sleeve or skirt portion 12 is internally threaded, as at 13, to threadedly engage an externally threaded portion 14 on an internal sleeve portion 15 on the male coupling part. A packing washer 16 may be provided between the adjacent surfaces of the male and female coupling parts so as to provide a fluid-tight joint. The male and female coupling parts are provided with wrench-engaging portions 10a, 11a, respectively, so that these parts can be tightly secured together. The female coupling part 11 is provided with an outward extension 17 which is centrally bored, as at 18, and which is provided with external threads 17a adapted for connection to a suitable inlet conduit. The male coupling part 10 is provided with an outward extension 19 which is centrally bored, as at 20, and which is also externally threaded, as at 19a, in order to adapt it for connection to a suitable outlet conduit.

The inner surface of the sleeve portion 12 on the female coupling part 11 is provided with an outwardly offset wall portion 21 and an annular shoulder 22. A ring member or annulus 23 is pressed into the wall portion 21 with one end thereof abutting against the shoulder 22. The opposite end of the ring 23 is disposed adjacent the inner end of the internal sleeve portion 15 on the male coupling part 10. The inner surface of the ring member 23 is substantially flush with the inner end of the surfaces of the sleeve portion 12 and the sleeve portion 15 so as to present a smooth surface to the fluid passing therethrough. There is also provided an inner ring or annulus 24 which is illustrated as being connected to the outer ring member 23 by integral spokes or ribs 25 which extend radially between the two ring members and form arcuate passages which, in turn, provide a substantially unobstructed annular passage for the fluid. The inner ring or sleeve member 24 serves as a guideway for the valve stem 26 which is in the form of a sleeve having a valve member 27 formed on one end thereof and adapted to cooperate with a valve seat 28 at the inner end of the inlet passage 18.

The opposite end of the inner sleeve member 24 is closed by a plug 29 which may be secured thereto by a pin 30 or the like. The plug 29 is provided with an axial projection 31 which is disposed in line with the valve sleeve 26. A coil spring 32 has one end thereof surrounding the projection 31 and bearing against the plug 29 and has the opposite end thereof disposed within the valve sleeve 26 and bearing against the valve member. Thus, the spring 32 tends to normally force the valve member 27 toward a seated position. A small bleed hole 33 may be provided in the side wall of the inner annulus 24 for the purpose of admitting fluid to the space 34 between the valve sleeve 26, the inner annulus 24 and the plug 29.

When the valve assembly is connected in a hydraulic pressure line, that is, between the inlet or supply line and the discharge or outlet line, fluid under pressure from a pump or other suitable source of supply will enter the inlet passage 18 and exert an opening force against the valve member 27. When the pressure reaches a degree sufficient to overcome the normal closing action of the spring 32, the valve member will have shifted away from the valve seat 28 and fluid will pass around the valve member and into the valve casing. From the valve casing, the fluid will pass along a substantially unobstructed annular passage between the concentric ring or sleeve members 23, 24 and then outwardly through the discharge passage 20. It will be seen, therefore, that the present construction is such as to maintain a substantially free flow of fluid when the valve member is open. Fluid on the discharge side of the valve member 27 will gain access to the chamber within the inner sleeve or ring 24 through the bleed hole 33 or, if desired, the bleed hole 33 may be omitted and fluid may gain access to the chamber 34 within the ring member 24 by seepage between the adjacent inner surfaces of the ring member 24 and the outer surface of the valve sleeve 26. Movement of the valve member away from the seat 28 will cause the valve sleeve or skirt 26 to reduce the effective size of the space or chamber 34 but the bleed hole 33 provides a restricted escape passage for the fluid so that the escape of fluid is substantially retarded. Thus, the chamber 34 acts as a cushioning means to prevent sudden movement of the valve member in an opening direction so that pounding or chattering of the valve is prevented.

When the pressure in the inlet line is reduced below a predetermined degree, the spring 32 tends to force the valve member 27 toward its closed position resting on the valve seat 28. During this closing movement of the valve member, a partial vacuum is created within the chamber 24 since the restricted aperture 33 retards flow of fluid from the valve casing into the chamber 34. Thus, pounding of the valve member on its seat is prevented and this elimination of pounding or chattering also serves to eliminate any peening of the valve member in striking the seat. The spring 32 tends to resist opening movement of the valve member 27 and tends to normally force the valve member toward its seated position. The chamber 24 provides a cushioning means for checking or damping rapid movements of the valve member so as to prevent pounding or chattering thereof.

From the foregoing description, it will be seen that the present invention provides an efficient check valve assembly which necessitates the employment of a minimum number of parts. Furthermore, the construction is such that the entire valve assembly can be made in extremely small over-all dimensions while maintaining a substantially free flow of fluid therethrough. The outer periphery of the valve member 27 is substantially coincident with the outer surface of the inner ring member 24 so that fluid is caused to readily pass around the valve member and into the substantially unobstructed passage which is provided between the inner and outer ring members 23, 24. It is to be further noted that the concentric ring assembly, the valve seat 28 and the valve member and valve sleeve, are entirely supported within the coupling part 11 so that the relatively movable parts can be accurately centered, thus assuring proper seating of the valve on the valve seat without any jamming during movements thereof. Thus, the present construction obviates the necessity of compensating for any inaccuracy or eccentricity of the threaded joint between the male and female coupling parts.

While one form of the invention has been shown for purposes of illustration, it is to be clearly understood that various changes in the details of construction and arrangement of parts may be made without departing from the scope of the invention as set forth in the appended claims.

I claim:

1. A check valve assembly comprising a casing having at its opposite ends projecting portions for pipe connections, each projecting portion having a port leading therethrough to the interior of the casing, said casing including inner and outer sleeves screw threaded one within the other, said outer sleeve being counter-bored to provide a shouldered recess, an outer ring fitting within said recess and bearing against said shoulder, said ring being clamped against the shoulder by the inner sleeve, said ring having radial inwardly extending spaced arms formed integral therewith, an inner ring concentric with said outer ring and formed integral with said arms, said outer ring being flush with the inner surface of the casing so as to provide free flowing fluid passages between the rings, said outer sleeve having a valve seat surrounding the port therein, a valve adapted to contact with said seat, said valve having a stem slidingly guided in said inner ring, said inner ring forming the sole guiding support for said valve, means for closing the end of the inner ring so as to provide a cushioning chamber of which the end of the valve stem forms one wall, a spring in said chamber for normally seating said valve, said inner ring having a restricted passage communicating between the valve casing and the cushioning chamber for preventing chattering or pounding of the valve member during operation thereof.

2. A check valve assembly comprising a casing having at its opposite ends projecting portions for pipe connections, each projecting portion having a port leading therethrough to the interior of the casing, said casing including inner and outer sleeves screw threaded one within the other, said outer sleeve being counter-bored to provide a shouldered recess, an outer ring fitting within said recess and bearing against said shoulder, said ring being clamped against the shoulder by the inner sleeve, said ring having radial inwardly extending spaced arms formed integral therewith, an inner ring concentric with said outer ring and formed integral with said arms, said outer ring being flush with the inner surface of the casing so as to provide free flowing fluid passages between the rings, said outer sleeve having a valve seat surrounding the port therein, a valve adapted to contact with said seat, said valve having a stem slidingly guided in said inner ring, said inner ring forming the sole guiding support for said valve, means for closing the end of the inner ring so as to provide a cushioning chamber of which the end of the valve stem forms one wall, a spring in said chamber for normally seating said valve, and means providing a restricted two-way communication between the valve casing and the cushioning chamber for preventing chattering or pounding of the valve member during operation thereof.

ARTHUR L. PARKER.